United States Patent [19]

Carbonnel

[11] 4,364,713
[45] Dec. 21, 1982

[54] ELECTROMAGNETIC CONDUCTION-PUMP FOR LIQUID METAL

[75] Inventor: Henri Carbonnel, Antony, France

[73] Assignee: NOVATOME, Robinson, France

[21] Appl. No.: 152,584

[22] Filed: May 23, 1980

[30] Foreign Application Priority Data

Jun. 7, 1979 [FR] France .................. 79 14585

[51] Int. Cl.³ .............................................. H02N 4/20
[52] U.S. Cl. ...................................................... 417/50
[58] Field of Search ............................ 417/50; 310/11

[56] References Cited

U.S. PATENT DOCUMENTS

| | | | |
|---|---|---|---|
| 3,287,677 | 11/1966 | Mohr | 417/50 X |
| 3,787,143 | 1/1974 | Carbonnel et al. | 417/50 |
| 4,143,997 | 3/1979 | Deshais | 417/50 |

FOREIGN PATENT DOCUMENTS

| | | | |
|---|---|---|---|
| 2356305 | 1/1978 | France | 417/50 |
| 2034981 | 6/1980 | United Kingdom | 417/50 |
| 450298 | 12/1974 | U.S.S.R. | 417/50 |

*Primary Examiner*—Carlton R. Croyle
*Assistant Examiner*—Edward Look
*Attorney, Agent, or Firm*—Pollock, Vande Sande & Priddy

[57] ABSTRACT

An electromagnetic conduction pump for liquid metal, including a part of refractory material; two magnetic circuits each including a horizontal arm embedded in the refractory material, the first having a gap and the other being closed; a rising channel arranged in the refractory material for pumping of the liquid metal passing through the gap in the first magnetic circuit and a closed turn of liquid metal communicating with the rising pumping channel at the place where it passes through the gap. The turn consists of a channel of inverted-U shape the legs of which dip into the bath of metal, one of the legs consisting of a section of the rising channel and the other leg partially interlacing the horizontal arm of the second magnetic circuit.

3 Claims, 4 Drawing Figures

ELECTROMAGNETIC CONDUCTION-PUMP FOR LIQUID METAL

FIELD OF THE INVENTION

The invention refers to an improvement applied to electromagnetic conduction-pumps for liquid metal, i.e., pumps in which the liquid metal is set in motion under the effect of a magnetic field and an electric current perpendicular to one another and passing through a rising channel for pumping the liquid metal (e.g. aluminum).

BACKGROUND

These pumps in general include a magnetic circuit for the creation of a field passing through the channel for pumping the metal and a turn of refractory material inside which is liquid metal in electrical contact with the metal contained in the rising pumping channel, at the level of the zone subjected to the magnetic field.

Such pumps are described in French Pat. No. 2,164,493, and are illustrated in FIG. 1 of the present application.

A pump of this type comprises a rising channel for pumping of the liquid metal 1 which passes through the gap 2 of a first electromagnetic circuit in the form of a yoke 3. This yoke is associated with a coil 4 wound round one side of it, which is fed with alternating current so as to create in the section of liquid metal located in the gap 2 a horizontal magnetic field.

The pump includes, in addition a second magnetic circuit in the form of a frame 5, a feed coil 6 wound round one side of the frame 5 and a conductive turn 7 of rectangular section surrounding another side of the frame 5.

The coil 6 is fed with alternating current so as to induce an alternating current in the loop 7. This loop 7 consists of liquid metal contained in a refractory envelope 8. This envelope 8 is connected to the channel 1 by two mouthpieces 9 and 9' each having an opening which puts the interior of the envelope 8 into communication with the interior of the channel 1, with the result that the metal can flow between the envelope 8 and the channel 1. The section of metal located between the two mouthpieces 9 and 9' is traversed by the alternating current generated in the loop 7.

The loop 7 is arranged so that the current flowing between the mouthpieces 9 and 9' is at right angles to the magnetic field created in the gap 2 and to the axis of the channel 1.

In order that the vertical electromagnetic force which is then created in the section of metal located between the mouthpieces 9 and 9' may always remain rising, it is necessary to see to it that the current and the magnetic field are approximately in phase.

Even if such pumps give satisfaction it is, however, found that with time the particles which are not conductive of electricity and which are carried along by the liquid metal have a tendency to be deposited in the loop 7 through which is generated the current which passes into the channel of liquid metal.

In the pumps which have just been described the loop 7 is consequently difficult to clean. An attempt to overcome this disadvantage is disclosed in a French application (published under Ser. No. 2,360,206). It refers to a variant of the pumps described above, in which the loop is rectilinear and opens into the metal bath through which the induced currents are closed.

Such pumps are of interest with respect to the cleaning of the loop, but the performance obtained is interior to that of the machines which are the object of French Pat. No. 2,164,493. This is due in particular to the fact that the loop, being rectilinear, is coupled more loosely to the arm of the frame 5 than in French Pat. No. 2,164,493. Again, the path of the loop being much longer than in the pumps of the latter patent, the loop opposes a high resistance to the induced current.

SUMMARY OF THE INVENTION

In order to alleviate all of these disadvantages, applicants have had the idea of producing a pump having submerged conduction in which the loop exhibits the shortest possible path so as to reduce the resistance opposed to the induced current, but in which the flow of the metal pumped is not impeded by a high load loss. The pump produced exhibits in addition a loop which is easy to clean.

The present invention refers to an electromagnetic pump having submerged conduction for liquid metal, which includes:

(a) part of refractory material which can be submerged in a bath of this liquid metal;

(b) a first magnetic circuit including a horizontal arm embedded in the refractory material and endowed with a gap;

(c) a second closed magnetic circuit endowed with a feed coil and including a horizontal arm embedded in the refractory material; and (d) a rising channel arranged in the refractory material for pumping of the liquid metal passing through the gap in the first magnetic circuit and a closed turn of liquid metal communicating with the rising pumping channel at the place where it passes through the gap.

In accordance with the invention the turn consists of a channel of inverted-U shape the median plane of which is a vertical plane passing through the gap in the first circuit. The two legs of the U dip into the bath of metal in order to close the turn, one of the legs in fact consisting of a section of the rising channel and the other leg partially interlacing the horizontal arm of the second magnetic circuit.

In such a pump the loop follows as closely as possible the outline of the magnetic circuit of the transformer which induces the currents in the turn. The performance obtained is thus improved.

In accordance with another characteristic of the invention the cross-section of the channel forming the loop diminishes continuously from the bottom of the legs of the U up to the zone passing through the gap.

In addition the loop is designed so that the metal flowing in the pump undergoes the least possible disturbance from the hydraulic point of view.

In accordance with another characteristic of the invention the submersible portion of the pump consists of the stack of a set of pieces of refractory material including cavities which form the rising pumping channel and the turn.

In order that the invention be more clearly understood, reference will now be made to the accompanying drawing, in which an embodiment of the invention is shown for purposes of illustration, and in which;

DETAILED DESCRIPTION

Figure 1:
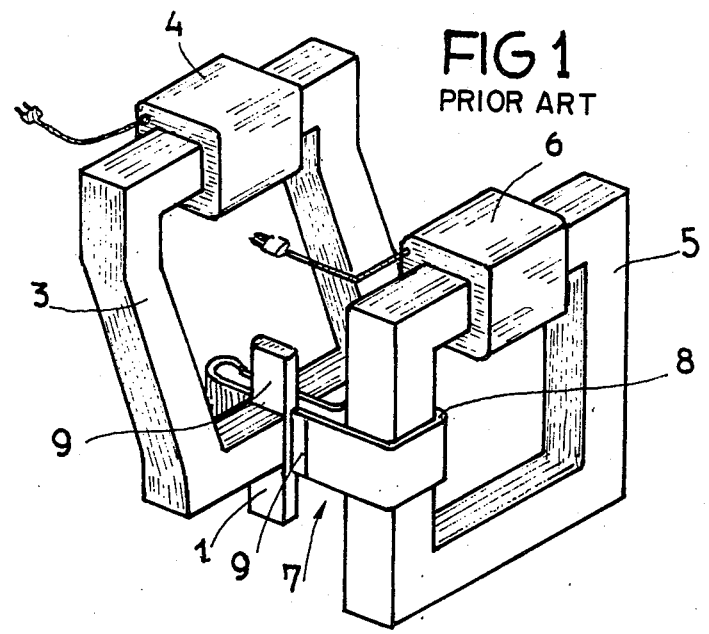
FIG. 1 represents a perspective view of a prior art pump.
Figure 3:
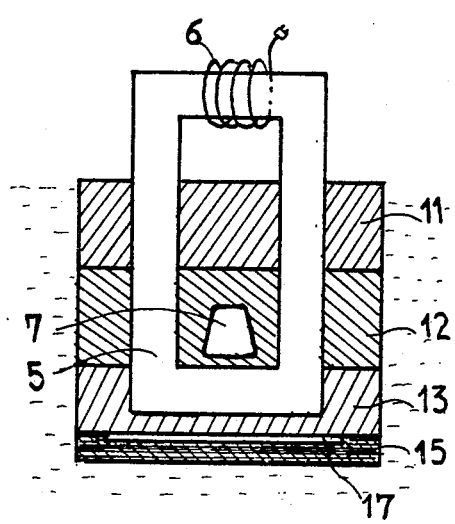
FIG. 3 represents a section through the pump of FIG. 2 taken at the level of the plane of the magnetic circuit 5.
Figure 4:
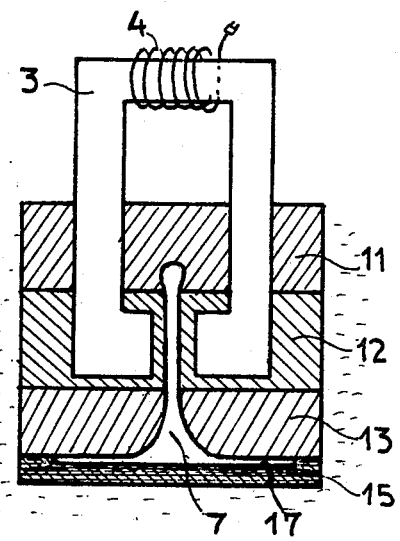
FIG. 4 represents a section of the pump of FIG. 2 taken at the level of the plane of the magnetic circuit 3.
Figure 2:
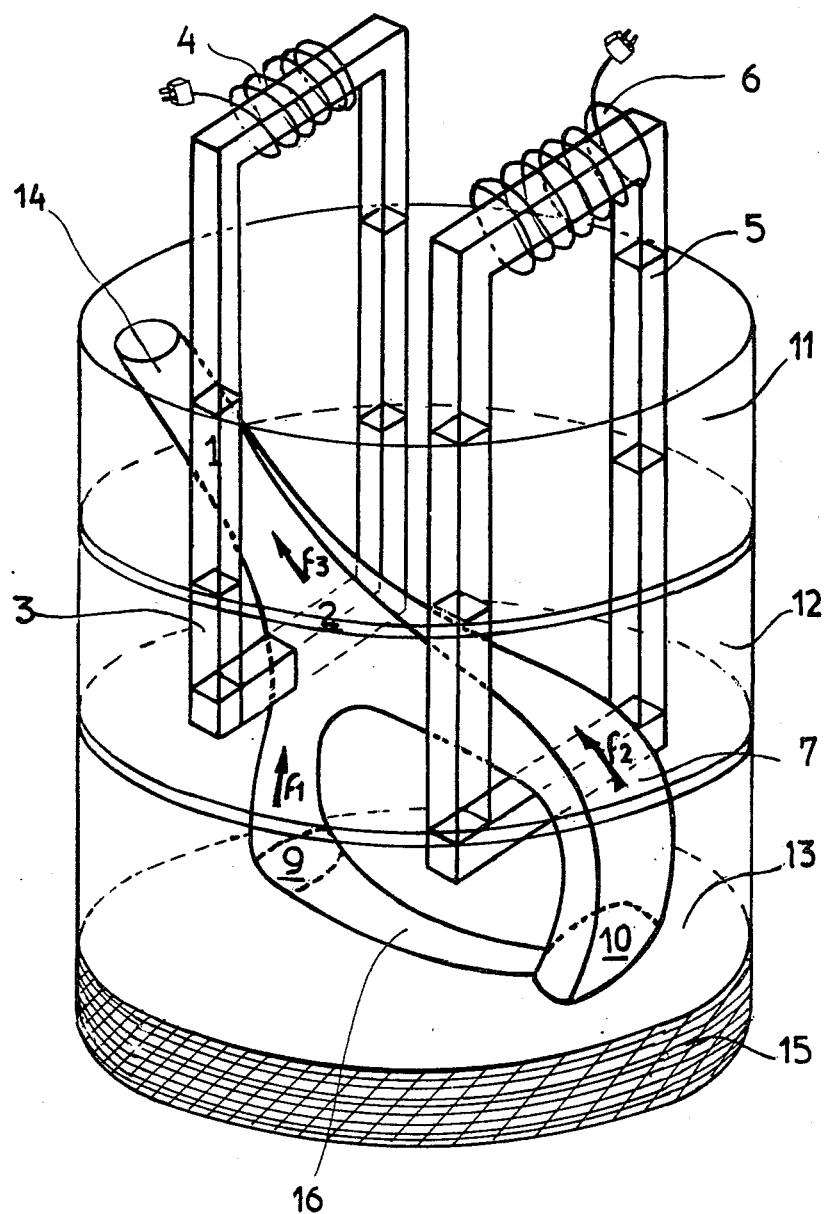
FIG. 2 represents a perspective of a pump in accordance with the invention.

In the various Figures, corresponding components bear the same reference numbers.

A first magnetic circuit 3 of C-shape is equipped with a coil 4 which may be fed with alternating current so as to create induction in the circuit and consequently a horizontal magnetic field at the level of the gap 2 arranged between the two arms of the circuit.

A second magnetic circuit 5 equipped with a coil 6 is a transformer which induces an electric current in a turn 7 of inverted-U shape containing liquid metal when the coil 6 is fed with alternating current. The electric current induced in the turn 7 passes across the gap 2. It is closed by employing the bath of metal in the zone 16 of its course since the turn is open into the bath through the apertures 9 and 10.

The magnetic circuits 3 and 5 are laminated and consist of sheets of magnetic cobalt alloy for high temperature.

The liquid metal is pumped by interaction of the magnetic field and the current in the loop in the gap 2. It is sucked in at the level of the apertures 9 and 10; it is delivered through the rising channel 1 as indicated by the arrows f1, f2 and f3.

The turn 7 is arranged in pieces of refractory material 11, 12 and 13 which are submerged in the bath of liquid metal. The liquid metal penetrating through the apertures 9 and 10 fills the turn 7; at that moment, if the coils 4 and 6 are being fed, an induced current arises in this loop and by the interaction of the magnetic field which prevails in the gap 2 the metal is pumped towards the discharge aperture 14. Before its arrival at the apertures 9 and 10, the liquid metal is filtered by a filter 15 submerged in the bath of metal, and fixed to or bearing against the piece 13. A suction chamber 17 is arranged between the piece 13 and the filter 15.

As to the upper portion of the pump, in particular the coils 4 and 6, they are located in a casing cooled by a flow of air.

The pump which has just been described displays numerous advantages. In particular there is no dead zone at any point in the turn 7. Thus any formation of deposit on the walls of the loop is avoided, and the loop therefore has no need of being cleaned. In the event that cleaning is necessary, the apertures 9, 10 and 14 are of large dimensions and allow of easy mechanical cleaning at any point in the machine, more especially as the cross-section of the channel forming the turn diminishes continuously from the bottom of the legs of the U up to the zone passing through the gap.

In addition the course of the metal in the pump is very short and it undergoes the least possible disturbance from the hydraulic point of view; this, added to a gap likewise very much reduced and to close coupling between the loop 7 and the magnetic circuit 5, combines to obtain good performance.

The invention is not restricted to the embodiment which has just been described; any variant and points of detail may be modified without departing from the scope of the invention.

Thus the pieces of refractory material may be more numerous or else reduced to the number of 1 or 2. They may equally well be arranged in some other way or have some other shape than the biscuit shape which has been given them in the example described above.

The shape of the loop may likewise be slightly different so long as it straddles the magnetic circuit 5, clasping it sufficiently closely, and the path of the metal in the loop undergoes the least possible disturbance from the hydraulic point of view.

It is also possible to place a third magnetic circuit identical with the magnetic circuit 5 and symmetrical with respect to it about the magnetic circuit 3. This magnetic circuit would be endowed with a coil fed by an alternating current in phase with that in the coils 4 and 6. The third magnetic circuit would give rise to a current in the turn 7 which would be added arithmetically to the current produced by the magnetic circuit 5. Thus the conduction current, and consequently the flow-pressure performance of the pump would be strengthened.

What is claimed is:

1. An electromagnetic conduction pump for liquid metal, comprising
    (a) a part of refractory material which can be submerged in a bath of liquid metal;
    (b) a first magnetic circuit including a horizontal arm embedded in said refractory material and having a gap;
    (c) a second closed magnetic circuit having a feed coil and including a horizontal arm embedded in said refractory material;
    (d) a rising channel in said refractory material for pumping of said liquid metal passing through said gap in said first magnetic circuit and a closed turn of liquid metal communicating with said rising pumping channel at the location where it passes through said gap;
    (e) said turn comprising a channel of inverted-U shape the median plane of which is a vertical plane passing through said gap in said first magnetic circuit, the legs of said U dipping into said bath of metal in order to close said turn, one of said legs consisting of a section of said rising channel and the other leg partially interlacing said horizontal arm of said second magnetic circuit.

2. An electromagnetic conduction pump according to claim 1, wherein the cross-section of said channel forming said turn diminishes continuously from the bottom of the legs of said U up to the zone passing through said gap.

3. An electromagnetic conduction pump according to claim 1 or 2, wherein said submersible portion of said pump consists of the stack of a set of pieces of refractory material including cavities which form said rising pumping channel and said turn.

* * * * *